July 27, 1926.
M. LUDASY
1,594,311
COMBINED PIPE SUPPORT AND CLEANER
Filed May 21, 1925
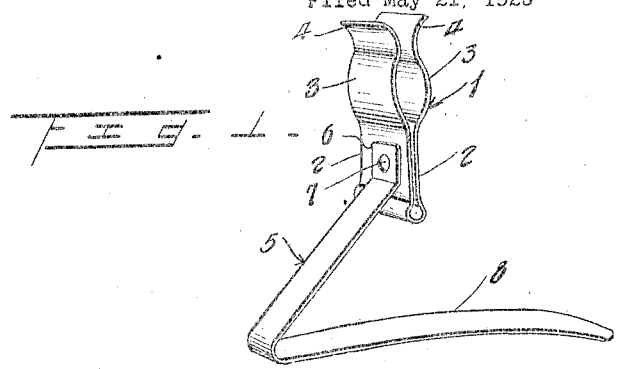
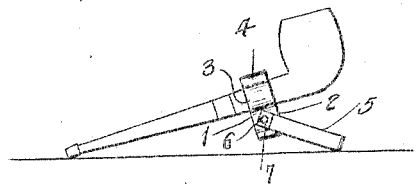
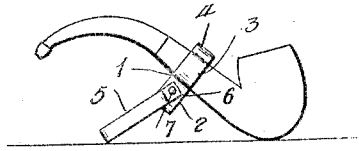
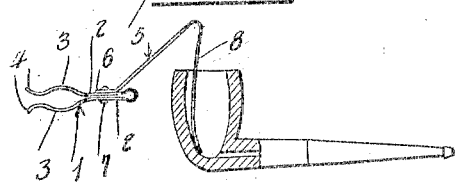
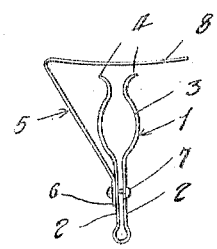
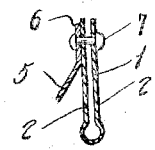
Inventor
M. Ludasy,

Patented July 27, 1926.

1,594,311

UNITED STATES PATENT OFFICE.

MARCELL LUDASY, OF RALEIGH, NORTH CAROLINA.

COMBINED PIPE SUPPORT AND CLEANER.

Application filed May 21, 1925. Serial No. 31,842.

The invention relates to means for engaging and holding a pipe with the bowl in an upright position to prevent spilling its contents and also the means combined therewith and forming the part of the support that may be used for cleaning the interior of the bowl of the pipe.

The invention has for its object the provision of a spring clip that is adapted to engage the stem of the pipe and an angular support pivotally secured thereto and adapted to be adjustably arranged thereon to form a base for the support when in use to hold the pipe bowl in an upright position, the free end of the angular member being curved and adapted to be used for scraping the interior of the bowl of the pipe in cleaning it.

The construction and operation and advantages of the invention will be described in detail hereinafter and will be found illustrated in the accompanying drawings, in which—

Figure 1 is a view in perspective of the improved pipe support and cleaner,

Figures 2 and 3 views showing the adaptation of the device for supporting pipes, Figure 4 a view showing the adaptation of the device as a pipe cleaner, Figure 5 a view showing the device in a closed position, and Figure 6 a sectional detail of the pivotal connection between the angular supporting member and the stem engaging clip.

In the drawings similar reference characters will be used to designate corresponding parts throughout the several views.

The pipe support is provided with a stem engaging member 1 made of a plate of spring metal such as steel and bent intermediate of its ends to provide two parallel flat surfaces 2 and outwardly bulged portions 3 that are adapted to engage the pipe stem, the extreme end of the plate of metal being formed outwardly divergent as shown at 4 to provide for readily seating the stem between the bulged portions 3.

A supporting member is provided and formed preferably of a non-resilient metal, said supporting member being designated 5 and is angular in shape as shown in the drawings and provided with an offset end 6 that is adjustably secured to the parallel portions 2 by means of a rivet 7, while the base portion 8 is formed slightly curved as shown.

The pivotal connection at 7 admits of the adjustment of the supporting member 5 relatively to the clip member 1 and the resilient nature of the clip 1 insures the retention of the position of the clip relatively to the supporting member in the different positions in which it may be adjusted, such different positions being suggested in Figures 2 and 3 and in folded position in Figure 5.

In Figure 4 is shown the adaptation of the article for use as a pipe cleaner in which the base portion 8 because of its slightly curved construction adapts such base portion to fit the curved contour of the interior of the pipe bowl so that the bowl may be readily cleaned therewith.

What is claimed is:—

1. A combined pipe support and cleaner, comprising a spring clip adapted to engage a pipe stem, an angular supporting arm made of a strip of metal, one end of said arm pivotally engaging said spring clip, and the other end of said arm being inwardly curved and forming the base of the support, said curved end of the arm also forming a cleaning blade for the pipe bowl.

2. A combination pipe support and cleaner, comprising a spring clip adapted to engage a pipe stem, a supporting arm made of a strip of metal bent intermediate of its ends to form an angular support for the clip, one end of said arm being deflected and pivotally secured to the clip, and the other end of the arm forming the base of the support and adapted to be used to clean the bowl of the pipe.

In testimony whereof I affix my signature..

MARCELL LUDASY.